Patented June 24, 1941

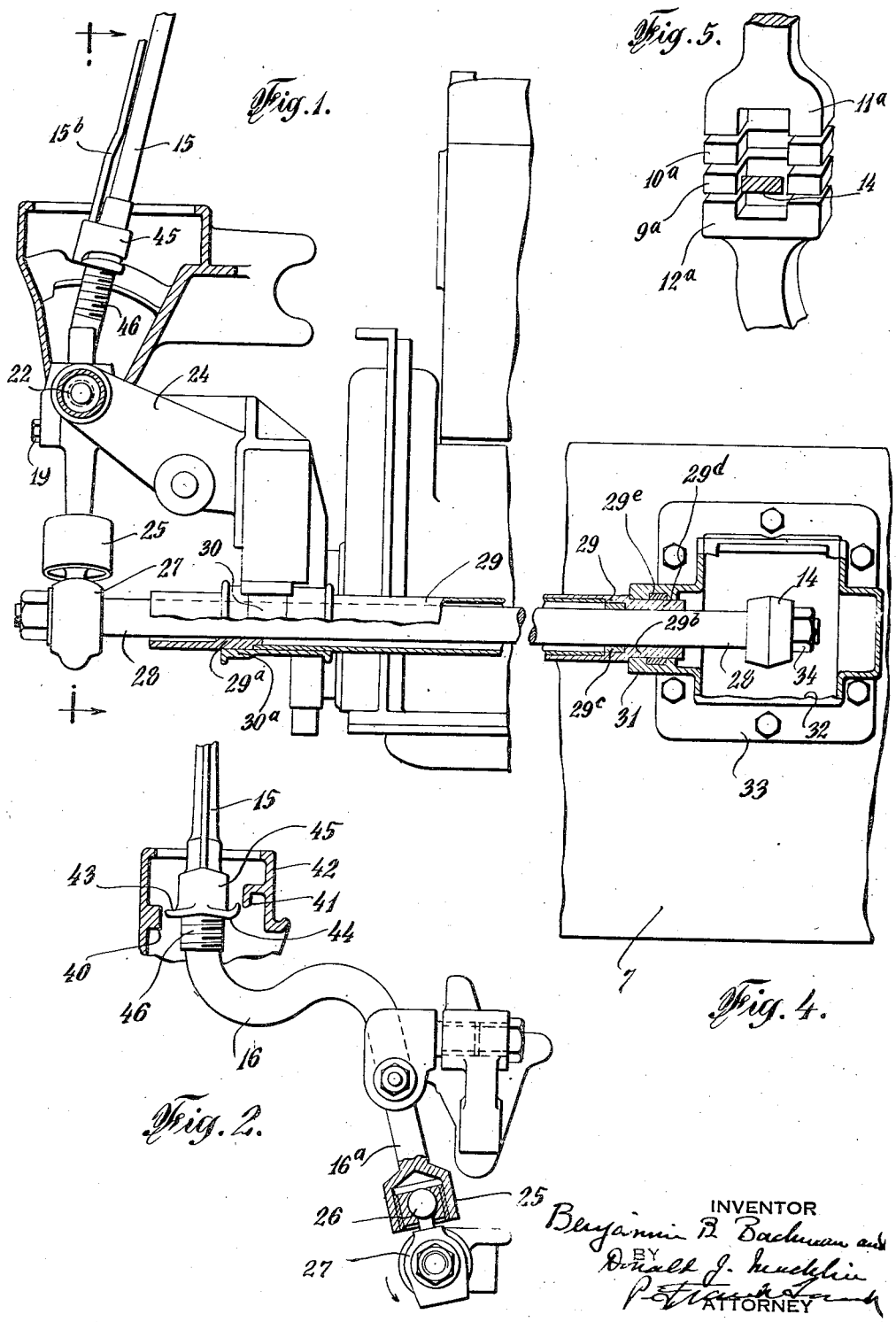

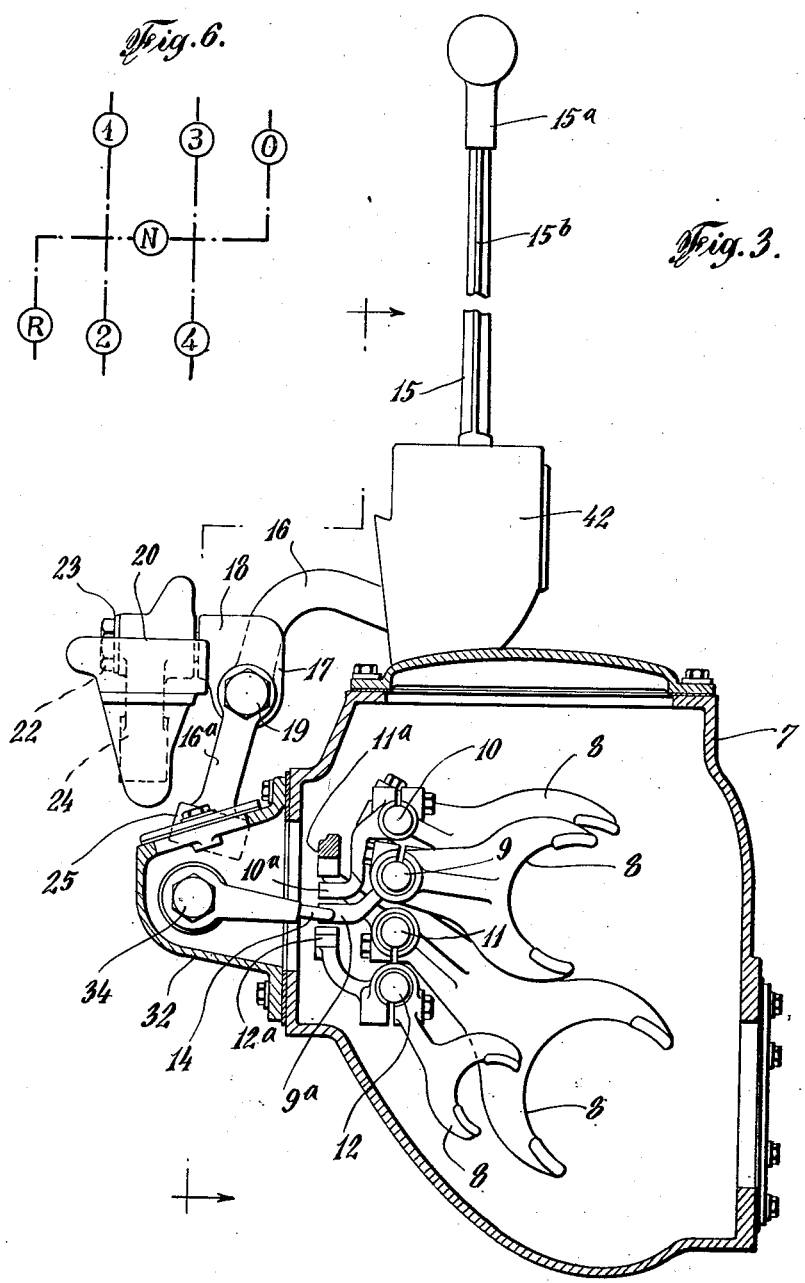

2,246,830

UNITED STATES PATENT OFFICE 2,246,830

MOTOR VEHICLE CONSTRUCTION

Benjamin B. Bachman, Philadelphia, and Donald J. Macklin, Bala Cynwyd, Pa., assignors to The Autocar Company, Ardmore, Pa., a corporation of Pennsylvania Application November 26, 1937, Serial No. 176,438

3 Claims. (Cl. 74—476)

This invention relates generally to power transmitting means and is more particularly directed to change speed gear-sets or transmissions, as used in the construction and operation of automotive vehicles, and mechanism for conditioning the same for functioning in a desired speed.

In Letters Patent No. 2,094,976 granted October 5, 1937, there is shown and described certain mechanism for conditioning a gear-set or transmission, at a point remote therefrom, for operation in a preselected speed and the present invention is in the nature of an improvement thereon.

While this invention, similarly to that of the aforesaid Letters Patent, as will become manifest from the description thereof, is susceptible of a wide range of application in the automotive and other arts, for the purposes of this disclosure, it has been elected to present it, as it may be practiced in the construction and operation of trucks and other so-called commercial vehicles, especially of those types wherein the location of the gear-set does not admit of the direct association of the manually operable shifting lever therewith, as in conventional engine and transmission installations. However, this is merely illustrative and is not to be construed, in any sense, as a limitation of the scope of utility of this invention.

As is well known, various systems and mechanisms have been devised for conditioning the gear-set for operating in a selected speed, in those vehicles wherein the hand-actuatable shifting lever is located in advance of the gear-set, whether the latter is associated with the engine or otherwise. However, aside from their complicated and, in many instances, cumbersome and commercially impractical designs, those conditioning mechanisms existing prior to that shown and described in the aforesaid Letters Patent were further unsatisfactory, especially from the operator's standpoint, in that the shifting lever movements differed from those of the recognized standard shifting diagrams which, obviously, created a potential hazard in the operation of the vehicles in which they were incorporated.

The primary objective of the present invention is to further simplify and improve the construction and operation of a conditioning mechanism possessing the general advantageous characteristics of the mechanism of the aforesaid Letters Patent, as therein set forth, and thereby reduce production and installation costs, as well as to impart to the invention a wider scope of application.

A further important object of the present invention is to provide a mechanism for conditioning gear-sets or transmissions, for operating in a desired or selected speed, from a point distant therefrom, in which a conditioning operation may be more smoothly completed in response to the manipulation of the shifting lever, and with less effort, than in prior art apparatus, our mechanism embodying a minimum of interconnected relatively movable parts, which, obviously, results in a decrease in wear and lost motion and virtually eliminates adjustments and repairs.

Another object of this invention is to provide a mechanism for conditioning a gear-set for operating in a selected speed, at a point remote therefrom, including a hand actuatable shifting lever, the movements of which conform to those of the standard gear shifting diagram, for the type of transmission with which our mechanism may be associated.

It is also an object of this invention to provide a conditioning mechanism having the herein set forth characteristics and advantages, which may be readily associated with a standard type of transmission in installations in vehicles where the clearances would not admit of the employment of other systems or mechanisms, without considerable difficulty.

Other objects and advantages flowing from the practicing of our invention, will become evident as the description proceeds and we would have it clearly understood that we reserve unto ourselves all rights to the full range of equivalents, both in structure and in use, to which we may be entitled, under our invention, in its broadest aspect.

In the accompanying drawings, there is shown a preferred form of our invention, which may be employed in those vehicles in which the engine is within the cab or beneath the driver's seat, with the transmission associated therewith, or in a construction where the transmission is otherwise located with relation to the engine or the driving compartment. However, structural details may be varied to meet production and other requirements; also, the invention may be applied to uses other than those specified within the purview of the appended claims.

In the drawings:

Figure 1 is a side elevation of the hand-operated shifting lever and associated elements of our mechanism.

Figure 2 is a front elevation of the assembly shown in the preceding figure.

Figure 3 is an elevational view, partly in section, of the complete assembly constituting our conditioning means, looking from the rear end of the gear-set, from which the gear trains have been omitted.

Figure 4 is a longitudinal sectional view of the selector finger housing and portion of the shaft enclosing tube, shown in the preceding figure.

Figure 5 is a detail of the jaws of the slide rods of the gear-set and the cooperating selector finger, and Figure 6 is a diagram, illustrative of the preferred positions to which the shifting lever is actuated for engaging the gears for the speeds indicated.

Referring now to the drawings in detail, in which like characters of reference are employed to designate similar parts in the several views, 7 indicates the transmission housing, in which is mounted the usual gears (not shown) for obtaining the various operating speeds, in the present showing these being reverse, four forward speeds and a so-called overdrive, which may be a fifth speed forward, or an additional reverse speed.

As in the standard construction, the transmission includes the usual slidably mounted shifter rods, carrying the gear-engaging forks 8. The shifter rods, which are four in number, in the present showing, and designated by the reference numerals 9, 10, 11 and 12, are each provided with a jaw, 9a, 10a, 11a and 12a, which the selector finger 14 is adapted to enter in the operation of our conditioning mechanism, as hereinafter described.

The hand-operable shifting lever 15, which embodies a reversely curved intermediate section 16, is mounted within the bifurcated end 17 of a fitting 18, for relative movement about the axis of the connecting bolt 19, the stem of said fitting being entered in the bearing member 20 of the bracket 24 for rotative movement on its longitudinal axis, said stem, preferably, being threaded to receive the retaining nut 22 cooperating with the washer 23. The bracket 24, of the configuration shown, or any other suitable shape, is adapted to be fixed, as by bolting, to any appropriate rigid support, as a frame member. As will be seen, the lower end of said lever 15 is provided with a socket 25 for the reception of the ball end 26 of the lug 27, fixed to the end of the shaft 28 for movement therewith, in any preferred and practical manner, the shaft 28 being housed within a tube 29, and suitable fittings associated with the respective ends thereof embodying bearing surfaces, as at 29a and 29b, within which said shaft is rotatable and slidable, incidental to the performance of a conditioning operation, the bearing 29b including a packing 29c to prevent leakage of lubricant from the transmission. The fitting in which the forward end of the tube 29 is entered takes the form of a sleeve 30a, carried by the bracket 30, while the fitting in which the rear end of the tube is telescoped is shouldered, as at 29d, for entry in the bearing 31, provided by a forwardly directed extension at the end of the finger-housing casting 32, the latter bearing being undercut to receive packing material 29e. The casting 32, of an appropriate shape, is flanged, as at 33, for bolting to the transmission housing 7, as is shown in Figure 3, and houses the aforesaid selector finger 14, the latter being preferably keyed to the shaft 28 and locked against movement longitudinally thereof by the nut 34 threaded on said shaft.

As will be observed, the shaft 28 and its embracing tube 29 are mounted parallel to the longitudinal axis of the vehicle in which our conditioning mechanism is installed; also the transmission is so mounted to locate the shifter rods thereof in a plane parallel to said shaft, while the selector finger 14 is disposed at a right angle to said shaft and to the shifter rods, the jaws of the latter being in juxaposition to the selector finger, as in standard practice.

From the foregoing, it will be seen that the movement of the selector finger in engaging or picking up the respective shifter rods is in a vertical plane, such movement being effected by the rotation of the shaft 28 in response to the lateral rocking of the shifting lever 15 on its fulcrum 19, through the medium of the ball and socket joint 25—26, the shifting operation, following that of picking up the shifter rod, being accomplished by a forward or backward movement of the lever 15 on the axis of the fitting 18. Obviously, this will effect a longitudinal movement of the shaft 28 within the tube 29, and a corresponding movement of the shifter rod in the jaw of which the selector finger is entered.

In the present showing, the shifter rod 9 is actuated backwardly to condition the transmission gearing for functioning in first forward speed and forwardly for second speed, similar movements of rod 10 meshing the gears for third and fourth speeds respectively, while the rearward movement of rod 11 effects engagement of the overdrive gears and the forward movement of rod 12, the reverse speed gearing.

Assuming that the shifting lever and the selector finger are in their neutral positions, and it is desired to condition the transmission to function in first forward speed, the shift lever is moved to the left, the reverse directional movement of the portion 16a below the fulcrum 19, producing a rotative movement of the shaft 28, in the direction of the arrow in Figure 2, to enter the selector finger in the jaw 9a, as shown in Figure 3. As the shifting lever is now rocked forwardly on the axis of the fitting 18, the shaft 28 will be urged backwardly, the corresponding movement of the shifter rod 9 engaging the gears for said speed. The actuation of the lever 15 backwardly and to the left of neutral, will move the shaft in a reverse direction, the like directional movement of the shifter rod 9 resulting in the engagement of the gears for second speed.

For third and fourth speeds, forward, the lever 15 is rocked to the right from neutral, the reverse directional movement of the dependent portion 16a effecting the rotation of the shaft 28 to enter the finger 14 in the jaw 10a of the rod 10, the forward movement of the shifting lever, with a reverse movement of the shifter rod engaging the third speed gears, while opposite directional movements of these parts condition the transmission for fourth speed operation.

The lateral movement of the shifting lever in the conditioning operations just described is limited by the provision of fixed stops, which may be in the form of ribs 40 and 41 on the inner walls of the shift lever housing 42 and relatively adjustable stops carried by said lever. The latter stops may be in the form of projections 43 and 44 integral with the collar 45, mounted on the lever 15, within said housing 42, a spring 46, interposed between said collar and a supporting shoulder on said lever, maintaining the collar in a position on said lever to cause said projections to cooperate with the fixed stops 40 and 41 in limiting the lateral movement of the shift lever and thereby prevent accidental engagement of the overdrive or reverse speed gears.

If it is desired to condition the transmission for operation in the overdrive speed, the shift lever must be rocked to the right, as indicated in the diagram of Figure 6, to a greater degree than is requisite to the entry of the selector finger in the jaw of the third and fourth speed shifter rod 10. This is accomplished by the depression of the knob 15a as a part of the lever movement, which, through the connecting rod 15b, depresses the collar 45 in opposition to the spring 46 and permits the projection 43 to clear the rib 40 and ride thereunder. Obviously, the projection 44 is similarly displaceable, with respect to the opposite rib 41, when it is desired to mesh the gears for reverse speed, which requires an increased range of lever movement to the left.

As will be seen, the movement of the lever 15 to the right, beyond the effective limit of the stops 40 and 43, will produce a rotational movement of the shaft 28 which will enter the selector finger 14 in the jaw 11a of the rod 11, while the actuation of said lever to the left, for reverse speed, will oppositely rotate said shaft to locate said finger in the jaw 12a of the shifter rod 12, the conditioning operation being completed, when the finger is engaged with the jaw 11a, by the forward movement of the lever and in the reverse direction, when it is entered in the jaw 12a.

From the foregoing, it will be manifest that we have provided a system for actuating the gear-shifting elements of a gear-set, at a point remote therefrom, wherein the selecting and actuating movements of the shifting lever conform to those of the shift lever of the conventional type, so that an operator who is familiar with the manipulation of the latter will experience no difficulty in handling a vehicle embodying our invention.

While the invention has been described more or less specifically as utilized in conjunction with a six speed transmission, it may be employed, with the same advantages in the conditioning of a standard three or four speed gear-set for functioning in any of its speeds, such changes in details of structure as may be required to apply our invention to other types of transmissions than that herein shown, or in the attainment of the objectives to which our invention is directed, as hereinbefore set forth, in other applications, falling within the spirit and scope of this disclosure and of the invention as hereinafter defined.

We claim:

1. The combination with a gear-set having slidable shifter rods provided with jaws in superposed relation, all of said jaws being disposed in a vertical plane, of means for actuating said rods from a point remote from said gear-set, said means including a lever fulcrumed for fore and aft and lateral rocking movements on separate axes, a shaft, a selector finger rigid therewith and disposed at a right angle to the longitudinal axis of said shaft, an articulated connection between the end of said shaft and the end of said lever, whereby lateral movements of said lever will rotate said shaft to enter said finger in a jaw of a shifter rod and fore and aft movements of said lever will render said finger effective in the actuation of the rod to perform a gear-shifting operation, and means for limiting the opposite lateral movements of said lever for entering said finger in certain of the shifter rod jaws, said limiting means being capable of being rendered inoperative for increasing the range of such lateral movements of said lever, to enter said finger in one or another of the remaining shifter rods.

2. The combination with a gear-set having slidable shifter rods provided with jaws, of means for conditioning said gear-set for functioning in a preselected speed at a point remote therefrom, said means including a lever distant from said gear-set and mounted for fore and aft and lateral arcuate movement, a shaft mounted below said lever mounting for rotational and longitudinal movement parallel to said gear-set, a selector finger fixed to said shaft for movement therewith, an articulated connection between the end of said shaft and the end of said lever, said connection being disposed on the longitudinal axis of said lever, a housing for said selector finger having an end extension forming a bearing and detachably connectable to said gear-set housing, a tube surrounding said shaft, said tube being supported at one end by said finger housing bearing and at the other in juxtaposition to said lever, said finger being movable in response to lateral and fore and aft movements of said lever to enter the jaw of a shifter rod and effect the movement of said rod to gear-engaging position.

3. The combination with a gear-set, including a housing having slidable shifter rods provided with jaws, said housing having an opening therein in proximity to said jaws, of means for conditioning said gear-set for functioning in a preselected speed from a point remote therefrom, said means including a lever distant from the gear-set mounted for fore and aft and lateral rocking movement, a shaft, an articulated connection between said lever and one end of said shaft, a selector finger fixed to said shaft, a housing for said finger detachably connectable to the gear-set housing adapted to form a closure for said opening, said selector-finger-housing having an end extension for the reception of said shaft, fluid-tight bearing means between said extension and said shaft, a bearing for said shaft in juxtaposition to said lever, said shaft being capable of rotational and sliding movements in said bearing means and said bearing, in response to rocking movements of said lever, and a tubular housing for said shaft, extending from said latter bearing to said extension on the selector finger housing.

BENJAMIN B. BACHMAN.
DONALD J. MACKLIN.